[12] United States Patent
Zhang et al.

(10) Patent No.: US 8,156,958 B2
(45) Date of Patent: Apr. 17, 2012

(54) SERVICE REGULATOR WITH IMPROVED BOOST PERFORMANCE

(75) Inventors: Jun Y. Zhang, Xiangfan (CN); James C. Hawkins, Allen, TX (US); Ting Xu, Shanghai (CN)

(73) Assignee: Fisher Controls International LLC, Marshalltown, IA (US)

( * ) Notice: Subject to any disclaimer, the term of this patent is extended or adjusted under 35 U.S.C. 154(b) by 930 days.

(21) Appl. No.: 12/105,899

(22) Filed: Apr. 18, 2008

(65) Prior Publication Data

US 2008/0257427 A1 Oct. 23, 2008

Related U.S. Application Data

(60) Provisional application No. 60/913,135, filed on Apr. 20, 2007.

(51) Int. Cl.
*F16K 17/04* (2006.01)
*G05D 16/06* (2006.01)

(52) U.S. Cl. ............ 137/269; 137/505.11; 137/505.47

(58) Field of Classification Search ............ 137/269, 137/270, 271, 505.47, 505.11; 251/205, 251/333, 359, 360
See application file for complete search history.

(56) References Cited

U.S. PATENT DOCUMENTS

| | | | |
|---|---|---|---|
| 836,258 A | 11/1906 | Hubner et al. | |
| 1,166,027 A * | 12/1915 | Weisgerber et al. | 137/505.47 |
| 1,262,225 A | 4/1918 | Meyer | |
| 1,918,602 A | 7/1933 | Joyce | |
| 1,973,744 A | 9/1934 | Brown | |
| 2,173,707 A | 9/1939 | Brown | |
| 2,192,327 A | 3/1940 | Palmer | |
| 2,215,419 A | 9/1940 | Cheeseman | |
| 2,263,581 A | 11/1941 | Hughes | |
| 2,315,370 A | 3/1943 | Hughes | |
| 2,522,732 A | 9/1950 | Fairchild | |
| 2,619,983 A * | 12/1952 | Roberts | 137/484.8 |
| 2,688,980 A | 9/1954 | Pool | |
| 2,826,213 A | 3/1958 | Wright | |

(Continued)

FOREIGN PATENT DOCUMENTS

DE 37 14 065 A1 10/1987

(Continued)

OTHER PUBLICATIONS

Actaris Metering Systems, "CL34 Series Commercial Regulator, Advanced Metering and Regulation Technology at Work," pp. 1-12 (2001).

(Continued)

*Primary Examiner* — Eric Keasel
*Assistant Examiner* — Time Aigbe
(74) *Attorney, Agent, or Firm* — Marshall, Gerstein & Borun LLP (57) ABSTRACT

A regulator comprises a regulator valve and an actuator. The regulator valve comprises a valve body equipped with a customized valve port. That is, the valve seat is designed to have a customized seat height depending on a diameter of an orifice through the valve port, a longitudinal dimension of an orifice through the valve port, and/or a flow capacity of the valve port. Such a design advantageously maximizes the efficiency at which gas flows through the regulator. The actuator is coupled to the valve body and comprises a valve disc disposed within the valve body and adapted for displacement between a closed position engaging the valve seat and an open position spaced from the valve seat.

8 Claims, 4 Drawing Sheets

U.S. PATENT DOCUMENTS

| | | | |
|---|---|---|---|
| 2,827,069 A | 3/1958 | Peterson | |
| 2,869,575 A | 1/1959 | Hutchens | |
| 2,895,501 A | 7/1959 | Irwin | |
| 2,951,494 A | 9/1960 | Holmes | |
| 3,001,545 A | 9/1961 | Ziege | |
| 3,160,169 A | 12/1964 | Peterson | |
| 3,228,417 A | 1/1966 | Schwerter | |
| 3,386,465 A * | 6/1968 | Johnson | 137/463 |
| 3,392,749 A | 7/1968 | Gneiding et al. | |
| 3,420,257 A | 1/1969 | Lansky et al. | |
| 3,425,442 A | 2/1969 | Johnson et al. | |
| 3,488,685 A * | 1/1970 | Hughes | 137/116.5 |
| 3,525,356 A | 8/1970 | Johnson et al. | |
| 3,572,372 A | 3/1971 | Moore | |
| 3,580,271 A | 5/1971 | Farrer | |
| 3,599,658 A * | 8/1971 | Kruzan et al. | 137/116.5 |
| 3,613,725 A | 10/1971 | Hughes | |
| 3,621,867 A | 11/1971 | Johnson | |
| 3,623,506 A | 11/1971 | Bonner et al. | |
| 3,658,082 A | 4/1972 | DiTirro | |
| 3,705,599 A | 12/1972 | Sheward | |
| 3,722,536 A | 3/1973 | Hill et al. | |
| 3,754,570 A | 8/1973 | Hughes | |
| 3,809,108 A | 5/1974 | Hughes | |
| RE28,447 E | 6/1975 | Bonner et al. | |
| 3,892,255 A | 7/1975 | Johnson | |
| 4,019,531 A | 4/1977 | Johnson | |
| 4,067,354 A | 1/1978 | St. Clair | |
| 4,067,355 A | 1/1978 | St. Clair | |
| 4,069,839 A | 1/1978 | Hughes | |
| 4,176,677 A | 12/1979 | Hughes | |
| 4,195,656 A * | 4/1980 | Kanerva et al. | 137/458 |
| 4,485,843 A * | 12/1984 | Wolff | 137/514 |
| 4,505,292 A | 3/1985 | Osterode | |
| 4,679,592 A | 7/1987 | Lamb | |
| 4,754,778 A * | 7/1988 | Duffy et al. | 137/484.8 |
| 4,842,013 A | 6/1989 | Rice et al. | |
| 4,889,158 A | 12/1989 | Rice et al. | |
| 4,972,868 A | 11/1990 | Davis et al. | |
| 4,972,871 A | 11/1990 | Rice et al. | |
| 5,007,614 A | 4/1991 | Lockwood, Jr. | |
| 5,176,148 A | 1/1993 | Wiest et al. | |
| 5,697,398 A | 12/1997 | Gidney et al. | |
| 5,881,765 A | 3/1999 | Turney et al. | |
| 6,167,905 B1 | 1/2001 | Malloy et al. | |
| 6,321,166 B1 | 11/2001 | Evans et al. | |
| 6,422,260 B2 * | 7/2002 | Danowski et al. | 137/118.05 |
| 7,537,194 B2 | 5/2009 | Nagai | |
| 2004/0187930 A1 | 9/2004 | Hawkins et al. | |
| 2005/0106952 A1 | 5/2005 | Maxwell et al. | |
| 2006/0065307 A1 | 3/2006 | Schmidt et al. | |
| 2008/0031755 A1* | 2/2008 | Pekar | 417/566 |
| 2008/0257427 A1 | 10/2008 | Zhang et al. | |

FOREIGN PATENT DOCUMENTS

| | | | |
|---|---|---|---|
| DE | 295 06 395 U1 | 6/1995 | |
| GB | 0 966 346 A | 8/1964 | |
| GB | 1 220 467 A | 1/1971 | |
| GB | 2 024 996 A | 1/1980 | |
| WO | WO-02/093284 A1 | 11/2002 | |

OTHER PUBLICATIONS

Actaris Metering Systems, "B38 Series Commercial & Industrial Regulator, Advanced Metering and Regulation Technology at Work," pp. 1-27 (2002).

Actaris Metering Systems, "Gas Regulation Overview," pp. 1-16 (2004).

Actaris Metering Systems, "Regulator Loading Ring Instructions," pp. 1-2 (1996).

Emerson Process Management, "Y600A Series Pressure Reducing Regulators," Instruction Manual Form 5458, pp. 1-8 (2008).

Fisher-Rosemount, "Type Y600A Series Pressure Reducing Regulators. More Versatile Than Ever Before," pp. 1-2 (1998).

Schlumberger Gas, "CL-38 Series Constant Loaded Regulators," Data Sheet, pp. 1-8 (1997).

European Office Action for Application No. 08746310.5, dated Mar. 16, 2010.

International Preliminary Report on Patentability for Application No. PCT/US2008/060872, dated Oct. 20, 2009.

International Search Report for PCT/US2008/060872, mailed Aug. 5, 2008.

Australian Office Action for Application No. 2008242775, dated Nov. 16, 2010.

Australian Office Action for Application No. 2008242777, dated Nov. 29, 2010.

European Office Action for Application No. 08746287.5-2206, dated Mar. 15, 2010.

European Office Action for Application No. 08746291.7, dated Mar. 15, 2010.

International Preliminary Report on Patentability for Application No. PCT/US2008/060842, dated Oct. 20, 2009.

International Preliminary Report on Patentability for Application No. PCT/US2008/060846, dated Oct. 20, 2009.

International Search Resort for Application No. PCT/US2008/060842, dated Jul 29, 2008.

International Search Resort for Application No. PCT/US2008/060846, dated Aug. 6, 2008.

Office Action for Chinese Application No. 200880011137.X, dated Dec. 27, 2010.

Office Action for Chinese Application No. 200880012623.3, dated Dec. 21, 2010.

Office Action for Chinese Application No. 200880012891.5, dated Apr. 15, 2011.

Written Opinion for Application No. PCT/US2008/060842, dated Jul. 29, 2008.

Written Opinion for Application No. PCT/US2008/060846, dated Aug. 6, 2008.

Written Opinion for Application No. PCT/US2008/060872, dated Aug. 5, 2008.

Australian Office Action for Application No. 2008242690, dated Mar. 10, 2011.

Australian Office Action for Application No. 2008242692, dated Feb. 22, 2011.

European Examination Report for Application No. 08746296.6, dated May 26, 2011.

European Examination Report for Application No. 08746301.4, Jan. 20, 2011.

European Examination Report for Application No. 08746310.5, dated Aug. 8, 2011.

First Chinese Office Action for Application No. 200880009704.8, dated May 31, 2011.

First Chinese Office Action for Application No. 200880011104.5, dated Apr. 20, 2011.

First Chinese Office Action for Application No. 200880011778.5, dated Jun. 21, 2011.

First Chinese Office Action for Application No. 200880011630.1, dated Feb. 24, 2011.

First Chinese Office Action for Application No. 200880012891.5, dated Apr. 15, 2011.

International Preliminary Report on Patentability for Application No. PCT/US2008/060857, dated Oct. 20, 2009.

International Preliminary Report on Patentability for Application No. PCT/US2008/060860, dated Oct. 20, 2009.

International Search Report and Written Opinion for International Application No. PCT/US2008/060862, dated Aug. 5, 2008.

International Search Report for Applcation No. PCT/US2008/060857, dated Aug. 1, 2008.

International Search Report for Application No. PCT/US2008/060860, dated Aug. 5, 2008.

Office Action for Australian Application No. 2008242699, dated Sep. 22, 2011.

Office Action for Chinese Patent Applicaiton No. 200880012623.3, dated Dec. 21, 2010.

Office Action for Chinese Patent Application No. 200880011137.X, dated Dec. 27, 2010.

Office Action for Gulf Corporation Council Application No. GCC/P/2008/10630, dated Jul. 2, 2011.

Second Chinese Office Action for Application No. 200880011137.X, dated Sep. 1, 2011.
Written Opinion for Application No. PCT/US2008/060857, dated Aug. 1, 2008.
Written Opinion for Application No. PCT/US2008/060860, dated Aug. 5, 2008.
Written Opinion for Application No. PCT/US2008/060862, dated Aug. 5, 2008.
Second Office Action for Chinese Application No. 200880012623.3, dated Nov. 9, 2011.

* cited by examiner

SERVICE REGULATOR WITH IMPROVED BOOST PERFORMANCE

CROSS-REFERENCE TO RELATED APPLICATIONS

The priority benefit of U.S. Provisional Patent Application No. 60/913,135, entitled "Service Regulator with Improved Boost Performance," filed Apr. 20, 2007, is claimed and the entire contents thereof are expressly incorporated herein by reference.

FIELD OF THE INVENTION

The present invention relates to gas regulators, and more particularly, to gas regulators having actuators with closed-loop control.

BACKGROUND

The pressure at which typical gas distribution systems supply gas may vary according to the demands placed on the system, the climate, the source of supply, and/or other factors. However, most end-user facilities equipped with gas appliances such as furnaces, ovens, etc., require the gas to be delivered in accordance with a predetermined pressure, and at or below a maximum capacity of a gas regulator. Therefore, gas regulators are implemented into these distribution systems to ensure that the delivered gas meets the requirements of the end-user facilities. Conventional gas regulators generally include a closed-loop control actuator for sensing and controlling the pressure of the delivered gas.

In addition to a closed loop control, some conventional gas regulators include a relief valve. The relief valve is adapted to provide over pressure protection when the regulator or some other component of the fluid distribution system fails, for example. Accordingly, in the event the delivery pressure rises above a predetermined threshold pressure, the relief valve opens to exhaust at least a portion of the gas to the atmosphere, thereby reducing the pressure in the system.

Figure 1:
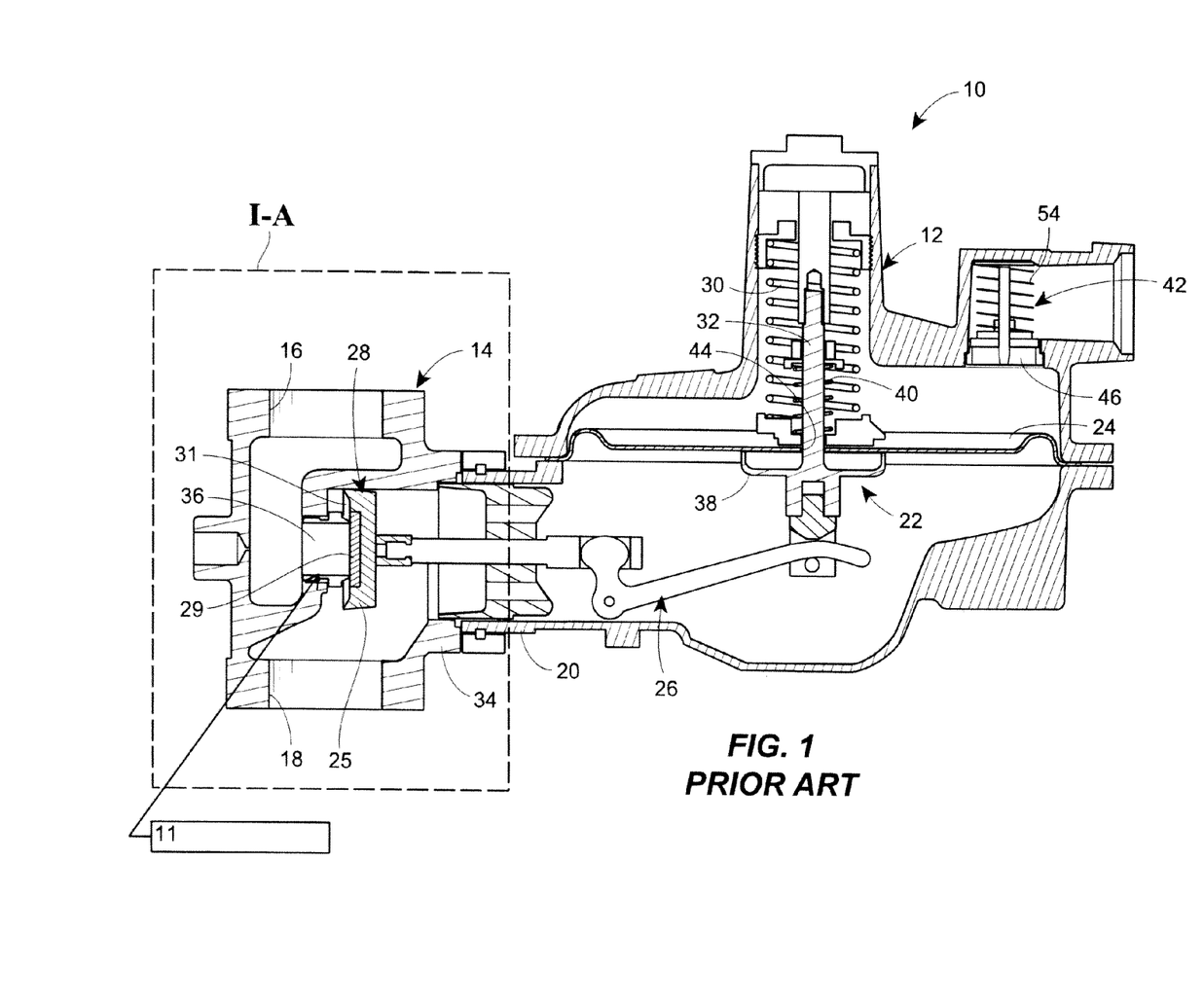
FIG. 1 is a side cross-sectional view of a conventional regulator.
Figure 1A:
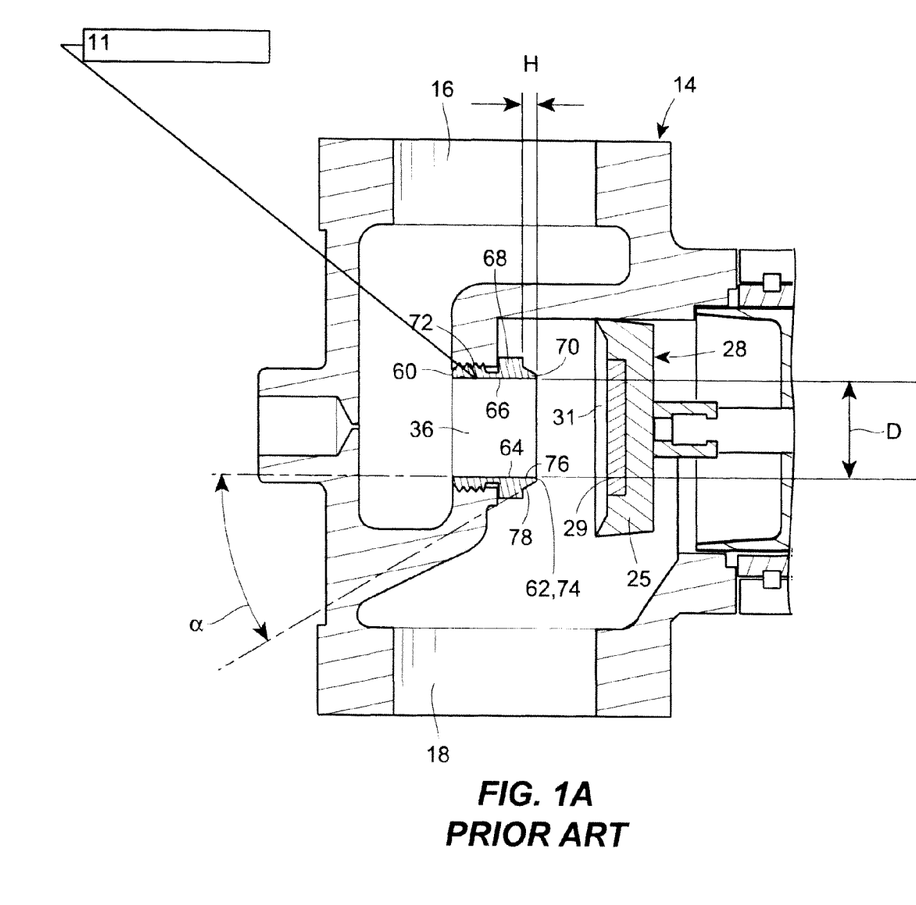
FIG. 1A is a side cross-sectional view of a regulator valve of the regulator of FIG. 1 including a conventional valve port.

FIGS. 1 and 1A depict one conventional gas regulator 10. The regulator 10 generally comprises an actuator 12 and a regulator valve 14. The regulator valve 14 defines an inlet 16 for receiving gas from a gas distribution system, for example, and an outlet 18 for delivering gas to an end-user facility such as a factory, a restaurant, an apartment building, etc. having one or more appliances, for example. Additionally, the regulator valve 14 includes a valve port 36 disposed between the inlet and the outlet. Gas must pass through the valve port 36 to travel between the inlet 16 and the outlet 18 of the regulator valve 14.

FIG. 1A depicts the regulator valve 14 including the conventional valve port 36 of the regulator 10 in more detail. The conventional valve port 36 generally includes a one-piece valve port having an inlet 60, an outlet 62, and an elongated, generally cylindrical orifice 64 extending between the inlet 60 and the outlet 62. Gas must flow through the orifice 64 to flow through the regulator valve 14.

Still referring to FIG. 1A, the valve port 36 includes a body portion 66, a hexagonal nut portion 68, and a valve seat 70. The body portion 66 is generally circular in cross-section and includes a plurality of external threads 72 in threaded engagement with the regulator valve 14. The hexagonal nut portion 68 includes a hexagonal cross-section and is adapted to be engaged by a tool such as a pneumatic ratchet, for example, to install the valve port 36 into the regulator valve 14 or remove the valve port 36 from the regulator valve 14 to replace it with another valve port having an orifice of a different diameter to tailor the operational flow characteristics of the valve port to a particular application.

The valve seat 70 protrudes from the hexagonal nut portion 68 in a direction opposite from the body portion 68. The valve seat 70 includes a ring-shaped valve seat 70 having a generally tapered, triangular cross-section converging from the hexagonal nut portion and terminating at a seating edge 74. More particularly, the conventional valve seat 70 includes an inner surface 76 and an outer surface 78, which meet at the seating edge 74. The inner surface 76 is an extension of the orifice 64 in the valve body 36, and therefore has a diameter common with the diameter of the orifice 64. The outer surface 78 extends at an angle of approximately 45° relative to the inner surface 76. Thus, the outer surface 78 is generally frustoconical.

In the conventional valve port 36 depicted in FIG. 1A, the valve seat includes a seat height H and an orifice diameter D. However, as mentioned above, the valve port 36 may be replaced with another valve port having an orifice with a different diameter to tailor the operational characteristics of the regulator 10. Regardless of the diameter of orifice 64, the seat height H is constant for conventional valve ports.

Referring back to FIG. 1, the actuator 12 of the conventional regulator 10 is coupled to the regulator valve 14 to ensure that the pressure at the outlet 18 of the regulator valve 14, i.e., the outlet pressure, is in accordance with a desired outlet or control pressure. The actuator 12 is therefore in fluid communication with the regulator valve 14 via a valve mouth 34 and an actuator mouth 20. The actuator 12 includes a control assembly 22 for sensing and regulating the outlet pressure of the regulator valve 14.

The control assembly 22 includes a diaphragm 24, a piston 32, and a control arm 26 having a valve disc 28. The valve disc 28 includes a generally cylindrical body 25 and a sealing insert 29 fixed to the body 25. The body 25 may also include a circumferential flange 31 integrally formed therewith, as depicted in FIG. 1A. The diaphragm 24 senses the outlet pressure of the regulator valve 14. The control assembly 22 further includes a control spring 30 in engagement with a top-side of the diaphragm 24 to offset the sensed outlet pressure. Accordingly, the desired outlet pressure, which may also be referred to as the control pressure, is set by the selection of the control spring 30.

The diaphragm 24 is operably coupled to the control arm 26, and therefore, the valve disc 28 via the piston 32, controls the opening of the regulator valve 14 based on the sensed outlet pressure. For example, when an end user operates an appliance, such as a furnace, for example, that places a demand on the gas distribution system downstream of the regulator 10, the outlet flow increases, thereby decreasing the outlet pressure. Accordingly, the diaphragm 24 senses this decreased outlet pressure. This allows the control spring 30 to expand and move the piston 32 and the right-side of the control arm 26 downward, relative to the orientation of the regulator 10 of FIG. 1. This displacement of the control arm 26 moves the valve disc 28 away from the seating edge 74 of the valve seat 70 of the valve port 36, thereby opening the regulator valve 14. FIG. 1A depicts the valve disc 28 in a normal, open operating position. So configured, the appliance may draw gas through the orifice 64 in the valve port 36.

In the position depicted in FIG. 1A, the valve disc 28 is displaced away from the valve port 36 to allow gas to flow through the regulator valve 14 during normal operational conditions. Generally speaking, the exact position of the valve disc 28 is dependent upon a variety of factors, one of which may include the amount of gas flowing through the valve port 36, i.e., the flow capacity of the valve port 36, which is itself dependent on the diameter and volume of the orifice 64 in the valve port 36. For example, if the valve port 36 depicted in FIG. 1A were replaced with a valve port having a smaller orifice, and therefore, a smaller flow capacity, the valve disc 28 would position itself closer to the valve port 36. However, this balance does not always create optimum flow characteristics through the regulator valve 14.

For example, when valve ports with smaller diameters are utilized, the flow of gas through the regulator valve 14 tends to increase in velocity, while the volume of space immediately downstream of the valve port, i.e., between the valve port and the valve disc, is reduced. This reduced volume between the throat 11 and the valve disc 28 may detrimentally affect the efficiency at which the gas travels from the valve port 36 to the outlet 18 of the regulator valve 14. For example, the reduced volume may not provide sufficient space for high velocity gas flowing through the valve port 36 to efficiently recover and emerge through the outlet 18. In some circumstances, this can result in an increase in pressure at the outlet 18, thereby causing the diaphragm to sense an artificial increase in sensed outlet pressure and move the valve disc 28 toward the valve port 36 to reduce the amount of flow through the regulator valve 14. This coincidentally, reduces the outlet pressure to a pressure that is below the set control or desired outlet pressure. This phenomenon is known as "droop." When "droop" occurs, the regulator 10 may not perform optimally.

In the conventional regulator 10 depicted in FIG. 1, the control assembly 22 further functions as a relief valve, as mentioned above. Specifically, the control assembly 22 also includes a relief spring 40 and a release valve 42. The diaphragm 24 includes an opening 44 through a central portion thereof and the piston 32 includes a sealing cup 38. The relief spring 40 is disposed between the piston 32 and the diaphragm 24 to bias the diaphragm 24 against the sealing cup 38 to close the opening 44, during normal operation. Upon the occurrence of a failure such as a break in the control arm 26, for example, the control assembly 22 is no longer in direct control of the valve disc 28 and inlet flow will move the valve disc 28 into an extreme open position. This allows a maximum amount of gas to flow into the actuator 12.

As the gas fills the actuator 12, pressure builds against the diaphragm 24 forcing the diaphragm 24 away from the sealing cup 38, thereby exposing the opening 44. The gas therefore flows through the opening 44 in the diaphragm 24 and toward the release valve 42. The release valve 42 includes a valve plug 46 and a release spring 54 biasing the valve plug 46 into a closed position, which is depicted in FIG. 1. Upon the pressure within the actuator 12 and adjacent the release valve 42 reaching a predetermined threshold pressure, the valve plug 46 displaces upward against the bias of the release spring 54 and opens, thereby exhausting gas into the atmosphere and reducing the pressure in the regulator 10.

When selecting a valve port for use in a particular application, technicians are charged with the task of maximizing flow capacity at the set control pressure while minimizing the amount of "droop." Typically, this is accomplished by selecting a valve port that affords some compromise between these competing interests. However, as mentioned above, these conventional valve ports only vary in orifice diameter and have constant seat heights. Therefore, while some conventional valve ports may function generally efficiently, other valve ports having different orifice diameters may not. Accordingly, the flow characteristics, and more particularly, the "boost" characteristics of the regulator 10 may not be optimized for every valve port.

SUMMARY

The present invention provides a regulator comprising a regulator valve and an actuator. The regulator valve comprises a valve body equipped with a customized valve port. The valve port has an inlet, an outlet, and an elongated orifice extending between the inlet and the outlet. The actuator is coupled to the valve body and comprises a control element including a valve disc. The valve disc is slidably disposed within the valve body and adapted for displacement between a closed position and an open position. The customized valve port includes a valve seat, against which the valve disc seals in the closed position to prevent the flow of gas through the regulator.

In one embodiment, the valve seat of the valve port has a custom seat height, which is dependent on the diameter, or flow capacity, of the elongated orifice, or some other operational characteristic, for example. So configured, the customized valve port maximizes the efficiency at which gas flows through the regulator valve.

DETAILED DESCRIPTION

Figure 2:
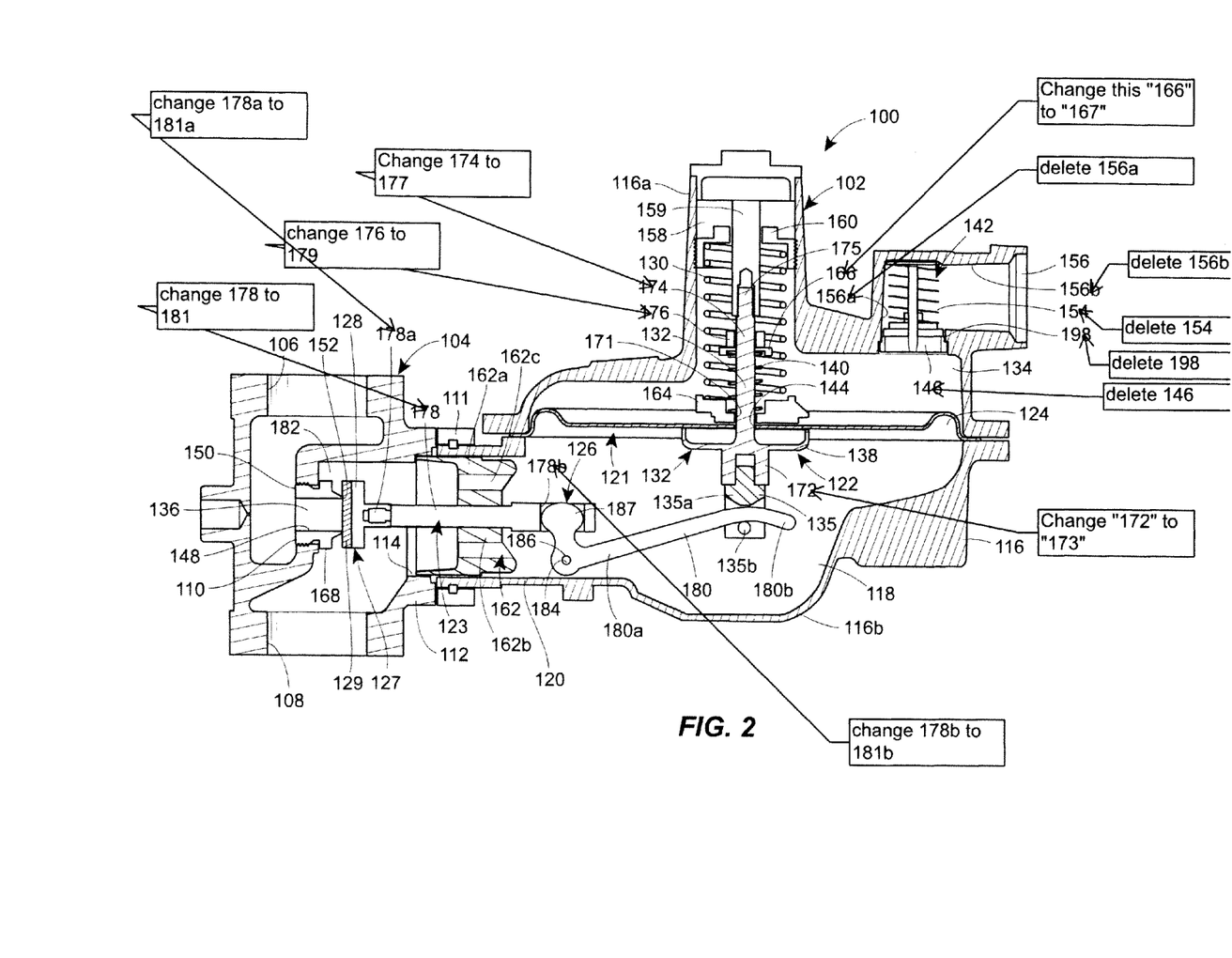
FIG. 2 is a side cross-sectional view of a regulator including a regulator valve and a valve port, the regulator, regulator valve, and valve port constructed in accordance with the present invention.

FIG. 2 depicts a gas regulator 100 constructed in accordance with one embodiment of the present invention. The gas regulator 100 generally comprises an actuator 102 and a regulator valve 104. The regulator valve 104 includes an inlet 106 for receiving gas from a gas distribution system, for example, and an outlet 108 for delivering gas to a facility having one or more appliances, for example. The actuator 102 is coupled to the regulator valve 104 and includes a control assembly 122 having a control element 127. During a first or normal operational mode, the control assembly 122 senses the pressure at the outlet 108 of the regulator valve 104, i.e., the outlet pressure, and controls a position of the control element 127 such that the outlet pressure approximately equals a predetermined control pressure. Additionally, upon the occurrence of a failure in the system, the regulator 100 performs a relief function that is generally similar to the relief function described above with reference to the regulator 10 depicted in FIG. 1.

With continued reference to FIG. 2, the regulator valve 104 defines a throat 110 and a valve mouth 112. The valve mouth 112 defines an opening 114 disposed along an axis that is generally perpendicular to an axis of the inlet 106 and the outlet 108. The throat 110 is disposed between the inlet 106 and the outlet 108, and accommodates a valve port 136 constructed in accordance with the present invention. The valve port 136 includes an inlet 150, an outlet 152, and an elongated orifice 148 extending between the inlet 150 and the outlet 152. Gas must travel through the orifice 148 in the valve port 136 to travel between the inlet 106 and the outlet 108 of the regulator valve 104.

Figure 3:
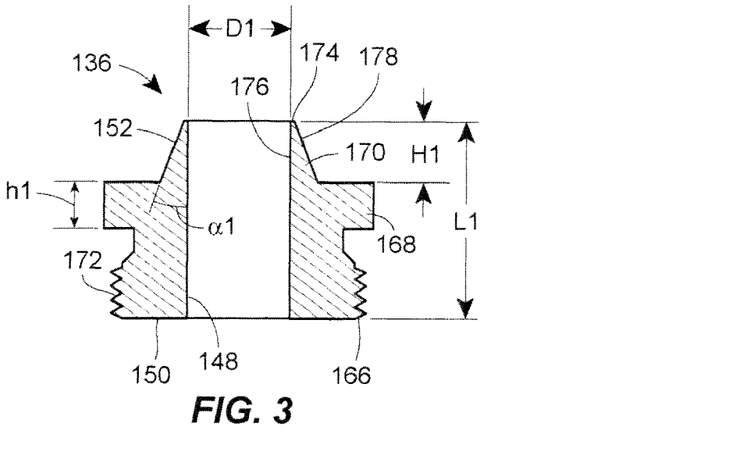
FIG. 3 is a side cross-sectional view of one valve port constructed in accordance with the present invention.

FIG. 3 depicts the valve port 136 of the regulator 100 of FIG. 2. The valve port 136 is customized to maximize the efficiency at which gas flows through the regulator valve 104. In addition to the inlet 150, the outlet 152, and the orifice 148, the valve port 136 includes a body portion 166, a hexagonal nut portion 168, and a valve seat 170. The body portion 166 is generally circular in cross-section and includes a plurality of external threads 172 adapted for threaded engagement with the throat 110 of the regulator valve 104, as depicted in FIG. 2. The hexagonal nut portion 168 includes a hexagonal cross-section and is adapted to be engaged by a tool such as a pneumatic ratchet, for example, to install the valve port 136 into the regulator valve 104 or remove the valve port 136 from the regulator valve 104 such that it may be replaced with another valve port having a different configuration to tailor the operational flow characteristics of the regulator 100 to a particular application.

The valve seat 170 protrudes from the hexagonal nut portion 168 in a direction opposite from the body portion 166. The valve seat 170 includes a ring-shaped valve seat 170 having a generally tapered, triangular cross-section converging from the hexagonal nut portion 168 and terminating at a seating edge 174. More particularly, the valve seat 170 includes an inner surface 176 and an outer surface 178, which meet at the seating edge 174. In the disclosed embodiment, the inner surface 176 is an extension of the orifice 148 in the valve body 136, and therefore has a diameter that is generally equal to the diameter of the orifice 148. So configured, the orifice 148 is generally uniformly constant in diameter. In the embodiment depicted in FIG. 3, the outer surface 178 of the disclosed embodiment extends at an angle α1 of between approximately 15° and approximately 30°, relative to the inner surface 176. Thus, the outer surface 178 is generally frustoconical.

The valve seat 170 of the valve port 136 depicted in FIG. 3 includes a set, i.e., a plurality of dimensional parameters including a seat height H1, a hexagonal nut height h1, and an orifice diameter D1. The seat height H1 is set as a function of the orifice diameter D1 such that the seat height H1 is customized for the particular orifice diameter D1, the particular flow capacity of the valve port 136, and/or the desired flow characteristics of the regulator 100 depicted in FIG. 2, for example. In the embodiment of the valve port 136 depicted in FIG. 3, the seat height H1 may include a dimension that is between approximately 60% and approximately 90% of a dimension of the orifice diameter D1. For example, in one embodiment, the seat height H1 may be approximately ⅜" and the orifice diameter D1 may be approximately ½". However, these dimensions are merely examples and alternative embodiments having alternative dimensions are intended to within the scope of the present invention.

Figure 4:
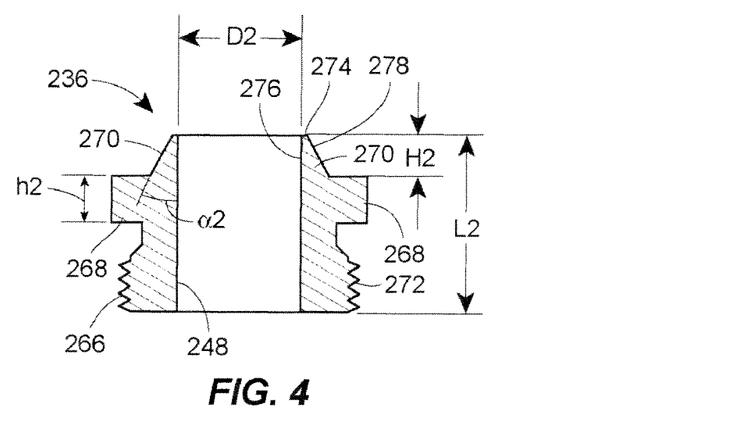
FIG. 4 is a side cross-sectional view of another valve port constructed in accordance with the present invention.

FIG. 4 depicts another valve port 236 constructed in accordance with the principles of the present invention that may be installed within the regulator valve 104 in place of the valve port 136 described above. The valve port 236 depicted in FIG. 4 is generally similar to the valve port 136 depicted in FIG. 3 in that it includes a body portion 266, a hexagonal nut portion 268, and a valve seat 270. The body portion 266 is generally circular in cross-section and includes a plurality of external threads 272 adapted for threaded engagement with the throat 110 of the regulator valve 104 depicted in FIG. 2, for example.

The hexagonal nut portion 268 includes a hexagonal cross-section and is adapted to be engaged by a tool such as a pneumatic ratchet, for example, to install the valve port 236 into the regulator valve 104 or remove the valve port 236 from the regulator valve 104.

The valve seat 270 protrudes from the hexagonal nut portion 268 in a direction opposite from the body portion 266. The valve seat 270 includes a ring-shaped valve seat 270 having a generally tapered, triangular cross-section converging from the hexagonal nut portion 268 and terminating at a seating edge 274. More particularly, the valve seat 270 includes an inner surface 276 and an outer surface 278, which meet at the seating edge 274. In the disclosed embodiment, the inner surface 276 is an extension of the orifice 248 in the valve body 236, and therefore has a diameter that is equal to the diameter of the orifice 248. So configured, the orifice 248 is generally uniformly constant in diameter. In the embodiment depicted in FIG. 4, the outer surface 278 of the valve seat 270 extends at an angle α2 of between approximately 25° and approximately 60°, relative to the inner surface 276, for example. Thus, the outer surface 278 of the disclosed embodiment is generally frustoconical.

Furthermore, the valve seat 270 of the valve port 236 depicted in FIG. 4 includes a set, i.e., a plurality, of dimensional parameters including a seat height H2, a hexagonal nut height h2, and an orifice diameter D2. The hexagonal nut height h2 of the valve seat 270 depicted in FIG. 4 is identical to the hexagonal nut height h1 of the valve port 170 depicted in FIG. 3. The seat height H2 of the valve port 236 depicted in FIG. 4 is less than the seat height H1 of the valve port 136 depicted in FIG. 3. The orifice diameter D2 of the valve port 236 depicted in FIG. 4 is greater than the orifice diameter D1 of the valve port 136 depicted in FIG. 3. In the embodiment of the valve port 236 depicted in FIG. 4, the seat height H2 may include a dimension that is between approximately 15% and approximately 50% of a dimension of the orifice diameter D2. For example, in one embodiment, the seat height H2 may be approximately ¼" and the orifice diameter D2 may be approximately ⅝". Thus, the seat height H2 of the valve port 236 depicted in FIG. 4 is customized to the orifice diameter D2.

Figure 5:
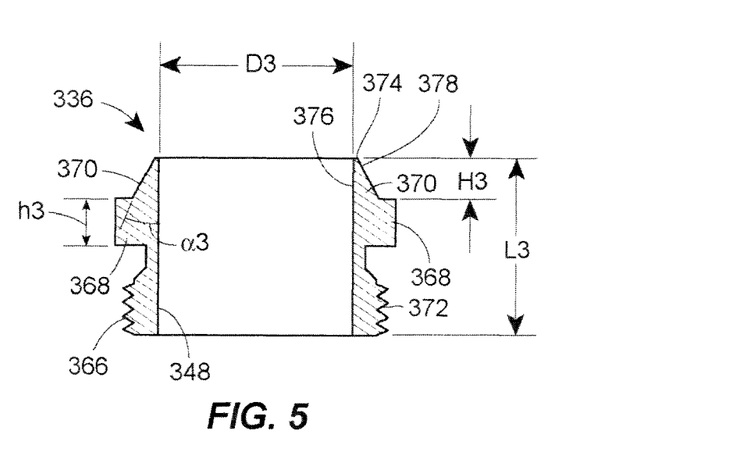
FIG. 5 is a side cross-sectional view of still another valve port constructed in accordance with the present invention.

FIG. 5 depicts yet another valve port 336 constructed in accordance with the principles of the present invention that may be installed within the regulator valve 104 in place of the valve ports 136, 236 described above. The valve port 336 depicted in FIG. 5 is generally similar to the valve ports 136, 236 depicted in FIGS. 3 and 4 in that it includes a body portion 366, a hexagonal nut portion 368, and a valve seat 370. The body portion 366 is generally circular in cross-section and includes a plurality of external threads 372 adapted for threaded engagement with the throat 110 of the regulator valve 104 depicted in FIG. 2, for example. The hexagonal nut portion 368 includes a hexagonal cross-section and is adapted to be engaged by a tool such as a pneumatic ratchet, for example, to install the valve port 336 into the regulator valve 104 or remove the valve port 336 from the regulator valve 104.

The valve seat 370 protrudes from the hexagonal nut portion 368 in a direction opposite from the body portion 366. The valve seat 370 includes a ring-shaped valve seat 370 having a generally tapered, triangular cross-section converging from the hexagonal nut portion 368 and terminating at a seating edge 374. More particularly, the valve seat 370 includes an inner surface 376 and an outer surface 378, which meet at the seating edge 374. In the disclosed embodiment, the inner surface 376 of the valve seat 370 is an extension of the orifice 348 in the valve body 336, and therefore has a diameter that is equal to the diameter of the orifice 348. So configured, the orifice 348 is generally uniformly constant in diameter. In the embodiment depicted in FIG. 5, the outer surface 378 of the valve seat 370 extends at an angle α3 of between approximately 15° and approximately 50°, relative to the inner surface 376. Thus, the outer surface 378 of the disclosed embodiment is generally frustoconical.

Furthermore, the valve seat 370 of the valve port 336 depicted in FIG. 5 includes a set, i.e., a plurality, of dimensional parameters including a seat height H3, a hexagonal nut height h3, and an orifice diameter D3. The hexagonal nut height h3 of the valve port 336 depicted in FIG. 5 is identical to the hexagonal nut heights h1, h2 of the valve ports 136, 236 depicted in FIGS. 3 and 4. The seat height H3 of the valve port 336 depicted in FIG. 5 is less than the seat heights H1, H2 of the valve ports 236, 336 depicted in FIGS. 3 and 4. In contrast, the orifice diameter D3 of the valve port 336 depicted in FIG. 5 is greater than the orifice diameters D1, D2 of the valve ports 136, 236 depicted in FIGS. 3 and 4. In the embodiment of the valve port 336 depicted in FIG. 5, the seat height H3 may include a dimension that is between approximately 5% and approximately 35% of a dimension of the orifice diameter D3. For example, in one embodiment, the seat height H3 may be approximately 3/16" and the orifice diameter D3 may be approximately 1". Thus, the seat height H3 of the valve port 336 depicted in FIG. 5 is customized to the orifice diameter D3.

Accordingly, in light of the foregoing, the valve ports 136, 236, 336 constructed in accordance with the principles of the present invention are designed in a custom manner to include valve seats 170, 270, 370 having specific seat heights H1, H2, H3 to maximize the efficiency of the flow of gas from the valve ports 136, 236, 336 and through the outlet 108 of the regulator valve 14 of FIG. 2. In the above-described embodiments, the seat heights H1, H2, H3 are designed as being generally inversely proportional to the orifice diameters D1, D2, D3. For example, it can be said for the purposes of explanation that the valve port 136, 236, 336 for any given application includes a plurality of dimensional parameters including a seat height H, an orifice length L, and an orifice diameter D, wherein the plurality of dimensional parameters are selected as a subset of dimensional parameters from a set of possible dimensional parameters H1, H2, H3, L1, L2, L3, D1, D2, D3, and wherein the seat heights H1, H2, H3 and the orifice lengths L1, L2, L3 of the set of possible dimensional parameters vary in inverse proportion to the orifice diameters D1, D2, D3 of the set of possible dimensional parameters.

Said another way, and for the purposes of explanation, the valve port 136, 236, 336 that is selected for any given application includes a selected set of parameters. The selected set of parameters include an orifice diameter D which comprises an internal diameter of the elongated orifice, and a seat height H, which comprises a distance at which the valve seat extends from the hexagonal nut portion of the valve port and along the orifice. The selected set of parameters D, H are pre-selected from a plurality of sets of parameters D1, D2, D3, H1, H2, H3, wherein each of the sets of parameters comprises an orifice diameter and a seat height such that the seat heights of the plurality of sets of parameters vary in inverse proportion to the orifice diameters of the plurality of sets of parameters.

In alternative embodiments, the seat heights H1, H2, H3 may be designed as a function of any other factor such as flow capacity of the particular valve port 136, 236, 336, desired outlet pressure, for example, or generally any other factor. Additionally, as mentioned, the flow capacities of the valve ports 136, 236, 336 are proportional to the orifice diameters D1, D2, D3, and as such, the flow capacities are inversely proportional to the seat heights H1, H2, H3.

Furthermore, as described herein, the valve seats 170, 270, 370 of the valve ports 136, 236, 336 comprise inner surfaces 176, 276, 376 that are extensions of the orifices 148, 248, 348. Therefore, the sets of parameters of each valve port 136, 236, 336 further comprise longitudinal dimensions L1, L2, L3 (shown in FIGS. 3-5) of the orifices 148, 248, 348. The longitudinal dimensions L1, L2, L3 include the seat heights H1, H2, H3. As such, the longitudinal dimensions L1, L2, L3 of the orifices 148, 248, 348 of the valve ports 136, 236, 336 are also designed to vary in inverse proportion to the diameters D1, D2, D3 of the orifices 148, 248, 348.

As will be discussed below, these customized seat heights H1, H2, H3 advantageously optimize flow performance, and more particularly, flow efficiency for each orifice diameter D1, D2, D3.

For example, referring back to FIG. 2, the actuator 102 of the regulator 100 constructed in accordance with the present invention includes a housing 116 and the control assembly 122, as mentioned above. The housing 116 includes an upper housing component 116a and a lower housing component 116b secured together with a plurality of fasteners, for example. The lower housing component 116b defines a control cavity 118 and an actuator mouth 120. The actuator mouth 120 is connected to the valve mouth 112 of the regulator valve 104 to provide fluid communication between the actuator 102 and the regulator valve 104. In the disclosed embodiment, the regulator 100 includes a collar 111 securing the mouths 112, 120 together. The upper housing component 116a defines a relief cavity 134 and an exhaust port 156. The upper housing component 116a further defines a tower portion 158 for accommodating a portion of the control assembly 122, as will be described.

The control assembly 122 includes a diaphragm subassembly 121, a disc subassembly 123, and a release valve 142. The diaphragm subassembly 121 includes a diaphragm 124, a piston 132, a control spring 130, a relief spring 140, a combination spring seat 164, a relief spring seat 167, a control spring seat 160, and a piston guide 159.

More particularly, the diaphragm 124 includes a disc-shaped diaphragm defining an opening 144 through a central portion thereof. The diaphragm 124 is constructed of a flexible, substantially air-tight, material and its periphery is sealingly secured between the upper and lower housing components 116a, 116b of the housing 116. The diaphragm 124 therefore separates the relief cavity 134 from the control cavity 118.

The combination spring seat 164 is disposed on top of the diaphragm 124 and defines an opening 171 disposed concentric with the opening 144 in the diaphragm 124. As depicted in FIG. 2, the combination spring seat 164 supports the control spring 130 and the relief spring 140.

The piston 132 of the disclosed embodiment includes a generally elongated rod-shaped member having a sealing cup portion 138, a yoke 173, a threaded portion 177, and a guide portion 175. The sealing cup portion 138 is concaved and generally disc-shaped and extends circumferentially about a mid-portion of the piston 132, and is located just below the diaphragm 124. The yoke 173 includes a cavity adapted to accommodate a coupler 135 which connects to a portion of the disc subassembly 123 to enable attachment between the diaphragm subassembly 121 and the disc subassembly 123, as will be described.

The guide portion 175 and the threaded portion 177 of the piston 132 are disposed through the openings 144, 171 in the diaphragm 124 and the combination spring seat 164, respectively. The guide portion 175 of the piston 132 is slidably disposed in a cavity in the piston guide 159, which maintains the axial alignment of the piston 132 relative to the remainder of the control assembly 122. The relief spring 140, the relief spring seat 167, and a nut 179, are disposed on the threaded portion 177 of the piston 132. The nut 179 retains the relief spring 140 between the combination spring seat 164 and the relief spring seat 167. The control spring 130 is disposed on top of the combination spring seat 164, as mentioned, and within the tower portion 158 of the upper housing component 116a. The control spring seat 160 is threaded into the tower portion 158 and compresses the control spring 130 against the combination spring seat 164. In the disclosed embodiment, the control spring 130 and the relief spring 140 include compression coil springs. Accordingly, the control spring 130 is grounded against the upper housing component 116a and applies a downward force to the combination spring seat 164 and the diaphragm 124. The relief spring 140 is grounded against the combination spring seat 164 and applies an upward force to the relief spring seat 167, which in turn is applied to the piston 132. In the disclosed embodiment, the force generated by the control spring 130 is adjustable by adjusting the position of the control spring seat 160 in the tower portion 158, and therefore the control pressure of the regulator 100 is also adjustable.

The control spring 130 acts against the pressure in the control cavity 118, which is sensed by the diaphragm 124. As stated, this pressure is the same pressure as that which exists at the outlet 108 of the regulator valve 104. Accordingly, the force applied by the control spring 130 sets the outlet pressure to a desired, or control pressure for the regulator 100. The diaphragm subassembly 121 is operably coupled to the disc subassembly 123, as mentioned above, via the yoke 173 of the piston 132 and the coupler 135.

Specifically, the disc subassembly 123 includes a control arm 126 and a stem guide 162. The control arm 126 includes a stem 181, a lever 180, and the control element 127. The control element 127 of the disclosed embodiment includes a valve disc 128. Additionally, in the disclosed embodiment, the valve disc 128 includes a sealing disc 129 for sealing against the outlet 152 of the valve port 136, as depicted in FIG. 2. The sealing disc 129 may be attached to the remainder of the valve disc 128 with adhesive, for example, or some other means. The sealing disc 129 may be constructed of the same material or a different material than remainder of the valve disc 128. For example, in one embodiment, the sealing disc 129 may include a polymer sealing disc 129.

The stem 181, lever 180, and valve disc 128 are constructed separately and assembled to form the control arm 126. Specifically, the stem 181 is a generally linear rod having a nose 181a and a recess 181b, which in the disclosed embodiment is generally rectangular. The lever 180 is a slightly curved rod and includes a fulcrum end 180a and a free end 180b. The fulcrum end 180a includes an aperture 184 receiving a pivot pin 186 carried by the lower housing component 116b. The fulcrum end 180a also includes a knuckle 187 having an elliptical cross-section and disposed within the recess 181b of the stem 181. The free end 180b is received between a top portion 135a and a pin 135b of the coupler 135 that is attached to the yoke 173 of the piston 132. Thus, the coupler 135 operably connects the disc subassembly 123 to the diaphragm subassembly 121.

The stem guide 162 includes a generally cylindrical outer portion 162a, a generally cylindrical inner portion 162b, and a plurality of radial webs 162c connecting the inner and outer portions 162b, 162a. The outer portion 162a of the stem guide 162 is sized and configured to fit within the mouths 112, 120 of the regulator valve 104 and lower housing component 116b, respectively. The inner portion 162b is sized and configured to slidably retain the stem 181 of the control arm 126. Thus, the stem guide 162 serves to maintain the alignment of the regulator valve 104, the actuator housing 116, and the control assembly 122, and more particularly, the stem 181 of the control arm 126 of the control assembly 122.

As mentioned, FIG. 2 depicts the regulator 100 of the present embodiment with the valve disc 128 in a closed position. Therefore, the valve disc 128 sealingly engages the outlet 152 of the valve port 136. So configured, gas does not flow through the valve port 136 and the regulator valve 104. This configuration is achieved because the outlet pressure, which corresponds to the pressure in the control cavity 118 of the housing 116 and sensed by the diaphragm 124, is greater than the force applied by the control spring 130. Accordingly, the outlet pressure forces the diaphragm 124, the piston 132, and the valve disc 128 into the closed position.

However, in the event that an operating demand is placed on the gas distribution system, e.g., a user begins operating an appliance such as a furnace, a stove, etc., the appliance draws gas flow from the control cavity 118 of the regulator 100, thereby reducing the pressure that is sensed by the diaphragm 124. As the pressure sensed by the diaphragm 124 decreases, a force imbalance occurs between a control spring force and an outlet pressure force on the diaphragm 124 such that the control spring 130 expands and displaces the diaphragm 124 and piston 132 downward, relative to the housing 116. This causes the lever 180 to pivot in the clockwise direction about the pivot pin 186, which, in turn, rotates the knuckle 187 relative to the recess 181b in the stem 181. This moves the stem 181 and the valve disc 128 away from the outlet 152 of the valve port 136 to open the regulator valve 104.

So configured, the gas distribution system is adapted to deliver gas to the downstream appliance through the regulator valve 104 at a control pressure that is set by the control spring 130. Additionally, the diaphragm subassembly 121 continues to sense the outlet pressure of the regulator valve 104. As long as the outlet pressure remains approximately equal to the control pressure, the control assembly 122 will keep the valve disc 128 in this same general position. However, if the outlet flow, i.e., the demand, decreases, thereby increasing the outlet pressure above the control pressure set by the control spring 130, the diaphragm 124 senses the increased outlet pressure and moves upward against the bias of the control spring 130. Alternatively, if the outlet flow, i.e., the demand, increases, thereby decreasing the outlet pressure below the control pressure, the diaphragm 124 senses the decreased outlet pressure and the spring 130 biases the diaphragm 124 and piston 132 downward to open the regulator valve 104. Thus, slight deviations from the outlet or control pressure causes the control assembly 122 to react and adjust the position of the valve disc 128 accordingly.

Accordingly, the regulator 100 equipped with any one of the valve ports 136, 236, 336 of the present invention functions generally similarly to the conventional regulator 10 described above with reference to FIGS. 1 and 1A. A distinction, however, is that each of the custom valve ports 136, 236, 336 constructed in accordance with the principles of the present invention optimize the efficiency at which gas flows through the regulator valve 104, and thereby offset the effects of "droop," which are apparent in the conventional regulator 10.

More particularly, as described above, conventional valve ports 36 have constant seat heights H, regardless of the specific diameter D of the orifice 64. During normal operating conditions, the conventional regulator 10 positions the valve disc 28 in an effort to balance the volume of space between the throat 11 of the regulator valve 14 and the valve disc 28 with the volume of the orifice 64. Therefore, the conventional regulator 10 positions the valve disc 28 closer to valve ports having orifices with relatively small diameters, and further from valve ports having orifices with relatively large diameters. However, orifices with relatively small diameters tend to accommodate higher velocity flows. These higher velocity flows tend to be more turbulent and require more than the allotted downstream volume to efficiently transition from the valve port 36 through the outlet 18 of the regulator valve 14. Thus, the conventional regulator 10 equipped with the conventional valve port 36 is susceptible to phenomenon known as "droop" in certain circumstances.

In contrast the conventional valve port 36, the valve ports 136, 236, 336 constructed in accordance with the present invention have varying seat heights H1, H2, H3, as described above. More specifically, the seat height H1, H2, H3 for any given valve port described above is generally inversely proportional to the diameter D1, D2, D3 of the respective orifice 148, 248, 348. Therefore, as orifice diameter is reduced, seat height is increased.

So configured, with reference to the vale port 136 depicted in FIG. 3, for example, the orifice diameter D1 is relatively small compared to the diameters D2, D3 of the orifices depicted in FIGS. 4 and 5. The valve port 136 is thus, adapted to accommodate higher velocity flows than the valve ports 236, 336. The seat height H1 of the valve port 136 depicted in FIG. 3, however, is relatively large compared to the seat heights H2, H3 of the valve ports 236, 336 depicted in FIGS. 4 and 5. Accordingly, during use with the regulator 100 depicted in FIG. 2, for example, the valve port 136 depicted in FIG. 3 would cause the regulator 100 to position the valve disc 128 a distance away from the valve port 136 that is commensurate with the volume of the orifice 148. Because the seat height H1 of the valve disc 136 is greater than the conventional seat height H, for example, the valve disc 128 would be positioned farther away from the valve port 136.

So configured, the valve disc 128 would be positioned farther away from the throat 111 of the regulator valve 104 to provide a greater downstream volume for the high velocity flow emerging from the valve port 136 to recover and travel through the outlet 108 more efficiently. This increased efficiency therefore reduces the possibility of increased back-pressure at the outlet 108 of the regulator valve 104, which is responsible in some cases, for creating and/or magnifying "droop" in conventional regulators 10 equipped with conventional valve ports 36.

It should be appreciated that the valve ports 236, 336 described in reference to FIGS. 4 and 5 would operate similarly to the valve port 136 just described, with the exception that each would generate a unique flow path causing the regulator 100 to position the valve disc 128 in a unique position commensurate with the capacity and/or velocity of flowing therethrough.

For example, the valve ports 236, 336 depicted in FIGS. 4 and 5, which have diameters D2, D3 larger than the diameter D1 of the valve port 136 depicted in FIG. 3, may cause the regulator 100 to position the valve disc 128 relative to the throat 110 of the regulator valve 104 commensurate with the capacity and velocity of the flow of gas in the particularly applications.

Accordingly, it should be appreciated that the present invention advantageously provides valve ports 136, 236, 336 with customized seat heights H1, H2, H3, adapted for increasing the efficiency of the flow of gas through the regulator valve 104 of FIG. 2, for example. This increase in efficiency is directly related to the accuracy of performance of the regulator 100 and, more particularly, to the offsetting or canceling of "droop," thereby providing a more reliable regulator 100.

In a commercial embodiment, a plurality of valve ports constructed in accordance with the principles of the present invention, such as the valve ports 136, 236, 336 disclosed herein, can be combined in a common packaging or kit, for example, to be provided to consumers or installation technicians. So provided, the consumers or technicians can easily obtain a variety of valve ports having a variety of flow capacities, thereby enabling the consumer or technician to customize a regulator or other fluid flow device to satisfy a desired application. For example, when assembling a regulator into a fluid distribution system, the consumer or technician could select a valve port from the plurality of valve ports that will most closely satisfy the flow characteristics of the specific application, and subsequently install the selected valve port into the regulator or other flow device on-site.

It should be appreciated that while the embodiments of the present invention have thus far been described as including customized seat heights H1, H2, H3 for the valve ports 136, 236, 336, various other aspects of the valve ports 136, 236, 336 may be similarly customized to increase the performance of the regulator 100.

For example, in one alternative embodiment, the shape and configuration of the seating surfaces 174, 274, 374 of the valve ports 136, 236, 336 may be customized based on the orifice diameters D1, D2, D3, or the flow capacities, for example. In another alternative embodiment, an angle of the seating surfaces 174, 274, 374 of the valve ports 136, 236, 336 may be customized based on the orifice diameters D1, D2, D3, or the flow capacities, for example. In still another alternative embodiment, the orifices 148, 248, 348 may include cross-sections other than circular cross-sections. The orifices 148, 248, 348 may include square, rectangular, or any other shaped cross-section. In still yet another embodiment, the orifices 148, 248, 348 may include other than uniformly cylindrical orifices 148, 248, 348, as depicted. For example, the orifices 148, 248, 348 may include converging and/or diverging orifices or portions. The present invention is not intended to be limited to the specific embodiments disclosed herein.

Still further, it should be appreciated that the present invention may be supplemented with additional concepts for increasing flow efficiency through a regulator and/or offsetting the effects of "droop."

In light of the foregoing, the present invention provides an advantageous means of offsetting and/or preventing the effects of "droop" in gas regulators by increasing the efficiency at which gas flows through the regulator valve and preventing the build-up of back-pressure. However, the regulator described herein is merely one example of a fluid control device incorporating the principles of the present invention. Other fluid control devices including other regulators and control valves may also benefit from the structures and/or advantages of the present invention.

What is claimed:
1. A fluid regulating device, comprising:
a valve body defining an inlet, an outlet, and a throat disposed between the inlet and the outlet;
an actuator coupled to the valve body and comprising a valve disc and a diaphragm operably coupled to the valve disc, the valve disc disposed in the valve body and adapted for displacement between an open position and a closed position relative to the throat of the valve body in response to changes in pressure at the outlet of the valve body sensed by the diaphragm;

a selected valve port disposed within the throat of the valve body, the selected valve port comprising a generally cylindrical member including a valve seat that is sealingly engaged by the valve disc when the valve disc is in the closed position, and an elongated orifice providing a flow path for fluid to pass through the selected valve port;

a seat height that comprises a distance that the valve seat extends along the elongated orifice; and an orifice diameter that comprises an internal diameter of the elongated orifice, the selected valve port being pre-selected from a plurality of valve ports, each of the plurality of valve ports comprising an elongated orifice having an orifice diameter, and a valve seat having a seat height, the seat heights of the plurality of valve ports varying in inverse proportion to the orifice diameters of the plurality of valve ports.

2. The device of claim 1, wherein the elongated orifices of the plurality of valve ports further comprise longitudinal dimensions, the longitudinal dimensions of the elongated orifices of the plurality of valve ports varying in inverse proportion to the orifice diameters of the plurality of valve ports.

3. The device of claim 1, wherein the plurality of valve ports further comprise flow capacities, the flow capacities of the plurality of valve ports varying in inverse proportion to the seat heights of the plurality of valve ports.

4. The device of claim 1, wherein the elongated orifice of each of the plurality of valve ports has a constant orifice diameter.

5. The device of claim 1, wherein the plurality of valve ports each further comprises a body portion and a hexagonal nut portion disposed between the body portion and the valve seat, the body portion of the selected valve port in threaded engagement with the throat of the valve body.

6. The device of claim 5, wherein the valve seats of each of the plurality of valve ports comprises a ring-shaped valve seat having a generally tapered cross-section converging from the hexagonal nut portion to a seating edge, the seating edge of the selected valve port sealingly engaged by the valve disc when the valve disc is in the closed position.

7. The device of claim 5, wherein the body portions and the hexagonal nut portions of the plurality of valve ports are identical.

8. A method of installing a fluid regulation device, the method comprising:

coupling a fluid input line to an inlet of a valve body;

coupling a fluid output line to an outlet of the valve body;

selecting a valve port from a plurality of valve ports, each of the plurality of valve ports comprising a valve seat, an elongated orifice, and a set of parameters including an orifice diameter, which comprises a diameter of the elongated orifice, and a seat height, which comprises a distance at which the valve seat extends along the orifice, the seat heights of the plurality of valve ports varying in inverse proportion to the orifice diameters of the plurality of valve ports; and installing the selected valve port into the throat of the valve body.

* * * * *

UNITED STATES PATENT AND TRADEMARK OFFICE
CERTIFICATE OF CORRECTION

| | |
|---|---|
| PATENT NO. | : 8,156,958 B2 |
| APPLICATION NO. | : 12/105899 |
| DATED | : April 17, 2012 |
| INVENTOR(S) | : Jun Y. Zhang et al. |

It is certified that error appears in the above-identified patent and that said Letters Patent is hereby corrected as shown below:

<u>In the Drawings:</u>

At Sheet 2, Fig. 2, the annotated sheet should be the replacement sheet.

<u>In the Specification:</u>

At Column 7, line 52, "include" should be -- includes --.

Signed and Sealed this
Eighth Day of October, 2013

Teresa Stanek Rea
*Deputy Director of the United States Patent and Trademark Office*

FIG. 1A
PRIOR ART